(No Model.)
A. E. DART.
CUT-OFF DEVICE FOR FLEXIBLE TUBES OR HOSE.
No. 318,091. Patented May 19, 1885.
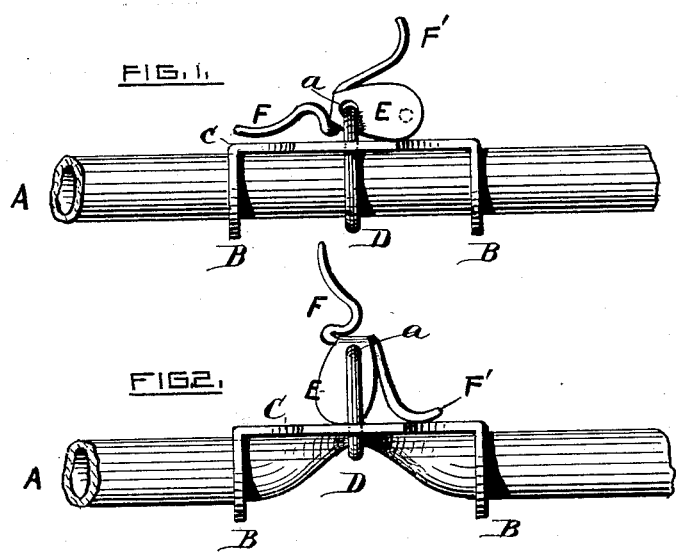
WITNESSES:
Daniel W. Fink
Warren R. Perce
INVENTOR.
Albert Edward Dart

UNITED STATES PATENT OFFICE.

ALBERT E. DART, OF PROVIDENCE, RHODE ISLAND, ASSIGNOR OF ONE-HALF TO SAMUEL H. TINGLEY, OF SAME PLACE.

CUT-OFF DEVICE FOR FLEXIBLE TUBES OR HOSE.

SPECIFICATION forming part of Letters Patent No. 318,091, dated May 19, 1885.

Application filed June 21, 1884. (No model.)

*To all whom it may concern:*

Be it known that I, ALBERT E. DART, of the city and county of Providence, in the State of Rhode Island, have invented a new and useful Improvement in Cut-Off Devices for Flexible Tubes or Hose; and I declare the following to be a specification thereof, reference being had to the accompanying drawings.

Like letters indicate like parts.

Figure 1 is a side elevation of my invention, showing the tube of full capacity. Fig. 2 is a side elevation of the same, showing the tube compressed to stop the flow.

My invention is adapted more especially to the flexible rubber tubes of fountain-syringes, but may be also used upon garden-hose or other flexible conductors of liquids. It consists of a metallic plate secured upon the tube by suitable rings, in combination with a metallic loop, which may be drawn transversely across said tube to compress the same by the action of a cam-lever, wherein said loop is mounted, as hereinafter more fully specified.

In the drawings, A represents a flexible rubber tube, passing through the rings B of the plate C. The plate C is made of metal or other suitable material. A loop or bow, D, preferably of metal, passes through the plate C and surrounds the tube A between the rings B. A cam-lever consisting of the cam E and finger-pieces F F', integral therewith, and bent in the peculiar form shown in the drawings, carries and operates the said loop D, which is mounted therein through the hole *a*. By pressure upon the finger-piece F' until it is in firm contact with the plate C, the cam E is turned to a position in which its major diameter lies in a direction just past a right angle to said plate, (see Fig. 2,) and the loop D is drawn by said movement of the cam, thereby compressing the tube A, so as to effectually prevent the flow of the water; but when the cam is tripped by pressure upon the finger-piece F, (see Fig. 1,) the loop D allows full capacity to the tube passing through it, and the current is not impeded. I am thus able to arrest and restore at will the flow of the liquid through the tube or hose by compression of the flexible material, but entirely without danger of cracking or otherwise injuring the hose, while the interior surfaces of the tube thus brought together into snug and forcible contact instantly and perfectly check and cut off the passage of the fluid therein. As my device is adapted by the rings B to slide along the tube A, it may be adjusted and located, as desired, at any position along the line of the hose wherever it may be desirable to control the flow of the liquid.

My invention is especially adapted for fountain-syringes—*i. e.*, those which convey liquids from a tank or reservoir elevated above the level of the discharging-nozzle, (as in the nasal douche,) and for various other uses, because the flow can be quickly and completely governed as necessity may require.

I claim as a novel and useful invention and desire to secure by Letters Patent—

The combination of the hose A, the plate C, having rings B, whereby it is adjustable along said hose, the loop D, and the cam-lever E F F', mounted upon said loop, all arranged and operating substantially as specified.

ALBERT E. DART.

Witnesses:
 DANIEL W. FINK,
 WARREN R. PERCE.